United States Patent
Shibata

(10) Patent No.: US 9,482,855 B2
(45) Date of Patent: Nov. 1, 2016

(54) MICROSCOPE SYSTEM

(71) Applicant: OLYMPUS CORPORATION, Tokyo (JP)

(72) Inventor: Motohiro Shibata, Tachikawa (JP)

(73) Assignee: Olympus Corporation, Tokyo (JP)

( * ) Notice: Subject to any disclaimer, the term of this patent is extended or adjusted under 35 U.S.C. 154(b) by 254 days.

(21) Appl. No.: 14/061,027

(22) Filed: Oct. 23, 2013

(65) Prior Publication Data

US 2014/0118499 A1 May 1, 2014

(30) Foreign Application Priority Data

Oct. 30, 2012 (JP) ................................. 2012-239143

(51) Int. Cl.
| | |
|---|---|
| *G02B 21/36* | (2006.01) |
| *G02B 27/22* | (2006.01) |
| *G06T 17/00* | (2006.01) |
| *G06T 5/00* | (2006.01) |
| *G06T 7/00* | (2006.01) |

(52) U.S. Cl.
CPC ......... *G02B 21/367* (2013.01); *G02B 27/2278* (2013.01); *G06T 5/002* (2013.01); *G06T 7/0069* (2013.01); *G06T 17/00* (2013.01); *G06T 2200/08* (2013.01); *G06T 2207/10056* (2013.01)

(58) Field of Classification Search
USPC ............ 382/254, 276; 359/368, 382; 348/46
See application file for complete search history.

(56) References Cited

U.S. PATENT DOCUMENTS

| | | | | | |
|---|---|---|---|---|---|
| 4,878,080 | A | * | 10/1989 | Takehana | ................ G02B 7/282 396/78 |
| 6,130,750 | A | * | 10/2000 | Ausschnitt | .......... G03F 7/70633 356/401 |
| 6,160,908 | A | * | 12/2000 | Hakozaki | ........... G02B 21/0076 250/201.3 |
| 6,344,930 | B1 | * | 2/2002 | Kaneko | ..................... G02B 3/14 348/E5.045 |
| 6,418,243 | B1 | * | 7/2002 | Skoglund | .............. G06T 11/003 345/419 |
| 2002/0030811 | A1 | | 3/2002 | Schindler | |
| 2005/0001157 | A1 | * | 1/2005 | Ishida | .................. G02B 21/008 250/234 |
| 2006/0050966 | A1 | * | 3/2006 | Nishimura | ............ G06T 7/0012 382/209 |

(Continued)

FOREIGN PATENT DOCUMENTS

| | | |
|---|---|---|
| JP | 2000-275541 A | 10/2000 |
| JP | 2001-174706 A | 6/2001 |

(Continued)

OTHER PUBLICATIONS

Nixon and Aguado "Feature Extraction & Image Processing" 2nd Edition 2008 Academic Press p. 88.*

(Continued)

*Primary Examiner* — Geepy Pe
(74) *Attorney, Agent, or Firm* — Scully, Scott, Murphy & Presser, P.C.

(57) ABSTRACT

In order to properly perform smoothing depending on depth-of-field so as to provide a 3D image with improved display image quality, a microscope system comprises: a microscope device 1 for acquiring a plurality of observation images with different focal points; a 3D image constructing unit 17 for constructing 3D image data based on the observation images; a smoothing strength calculating unit 18 for calculating smoothing strength for smoothing the 3D image data, based on optical information of the microscope device 1; and a smoothing unit 19 for smoothing the 3D image data with the smoothing strength calculated in the smoothing strength calculating unit 18.

3 Claims, 3 Drawing Sheets

(56) References Cited

U.S. PATENT DOCUMENTS

| | | | | |
|---|---|---|---|---|
| 2006/0269130 A1* | 11/2006 | Maroy | ................... | G06T 7/0081 382/173 |
| 2008/0174678 A1* | 7/2008 | Solomon | ............ | G02B 27/0025 348/231.99 |
| 2009/0046909 A1* | 2/2009 | Rutenberg | ................ | G06T 5/30 382/128 |
| 2009/0279808 A1* | 11/2009 | Shiraishi | ................. | G06T 5/002 382/275 |
| 2010/0027906 A1* | 2/2010 | Hara | ..................... | G06T 7/0085 382/264 |
| 2011/0187820 A1* | 8/2011 | Gilboa | ............... | H04N 13/0029 348/43 |
| 2012/0007939 A1* | 1/2012 | Michrowski | ........... | H04N 5/272 348/14.07 |

FOREIGN PATENT DOCUMENTS

| | | |
|---|---|---|
| JP | 2005-275199 A | 10/2005 |
| JP | 2006-126374 A | 5/2006 |
| JP | 2010-117229 A | 5/2010 |
| JP | 2011-4638 A | 1/2011 |
| JP | 2012-48579 A | 3/2012 |
| WO | 96/10196 A2 | 4/1996 |

OTHER PUBLICATIONS

Extended European Search Report dated Jan. 29, 2014 from related European Application No. 13 18 9704.3.
European Office Action dated Jun. 20, 2016 received in European Patent Application No. 13 189 704.3.

* cited by examiner

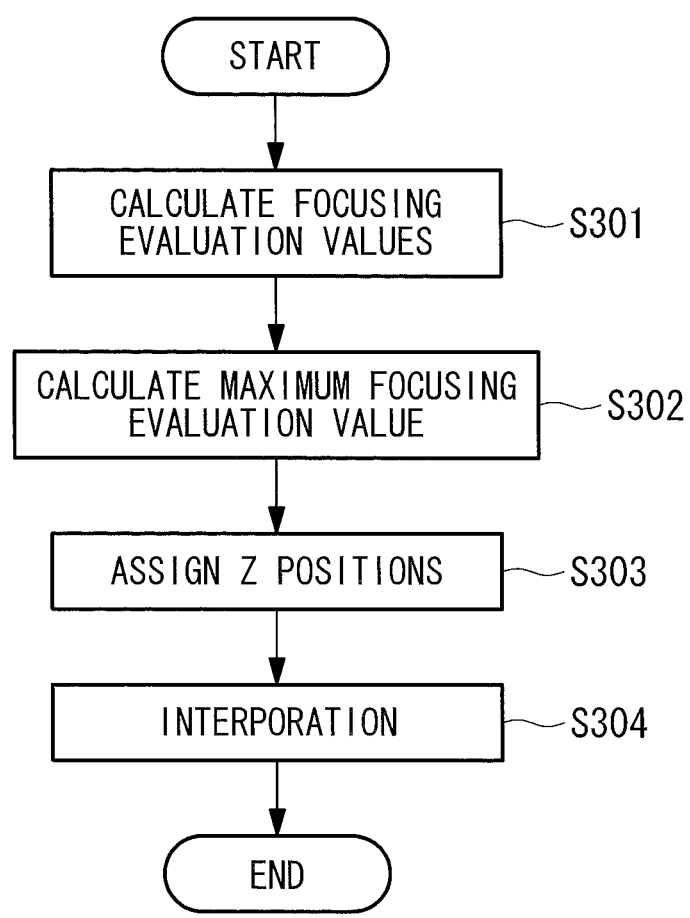

MICROSCOPE SYSTEM

TECHNICAL FIELD

The present invention relates to a microscope system, in particular to a microscope system capable of constructing a three-dimensional (3D) image of a specimen to be observed.

BACKGROUND ART

Known microscope devices include those in which images of a specimen are picked up at predetermined intervals in height, and a 3D image is constructed based on the images to present an overall shape of the specimen to be observed (See PTL 1, for example). Such 3D image construction methods include a Depth-From-Focus (DFF) method, for instance. The DFF method involves specifying a set of pixels (target pixels) at the same location in respective different images of a specimen to be observed where the respective images are picked up at different focus positions in the height direction, determining differential values in brightness between the respective target pixels and their peripheral pixels; and specifying the target pixel with the highest differential value among the set of target pixels. The method further involves assigning the focus positions of the images at the time of capture containing the specified target pixels as their height information to provide height direction coordinates of the images so that a 3D image can be constructed based on the distances calculated from those coordinate information. Alternatively, a 3D image can also be constructed by using a Depth-From-Defocus (DFD) method in which the blur extent of an image is determined by analysis, and is used to estimate the position of its focal point.

In detecting the focal points of images, grayscale variations across a specimen to be observed are detected as abnormal values such as noise in a 3D image to be constructed. Thus, smoothing is performed to reduce the occurrence of such abnormal values.

CITATION LIST

Patent Literature

{PTL 1}
Japanese Unexamined Patent Application, Publication No. 2010-117229

SUMMARY OF INVENTION

Technical Problem

However, in the above-described DFF or DFD method, as the accuracy of focal point detection depends on depth-of-field, the magnitude of abnormal values varies with depth-of-field. In a microscope disclosed in PTL 1, no consideration is given to this variation in magnitude of abnormal values, and thus uniform smoothing is performed on the image of a specimen, which can cause too strong or too weak smoothing effect depending on the condition of viewing the specimen. Too strong smoothing effect would cause blurred edges of the specimen image, and conversely, too week smoothing effect would cause significant occurrence of abnormal values, which, in either case, results in failure to construct a 3D image with good display image quality.

In light of the foregoing, it is an object of the present invention to provide a microscope system in which smoothing is properly performed depending on depth-of-field so as to provide a 3D image with improved display image quality.

Solution to Problem

In order to achieve the above-described object, the present invention adopts the following solution:

A microscope system which includes: a microscope device for acquiring a plurality of observation images with different focal points; a 3D image data constructing unit for constructing 3D image data based on the observation images; a smoothing strength calculating unit for calculating smoothing strength for smoothing the 3D image data, based on optical information of the microscope device; and a smoothing unit for smoothing the 3D image data with the smoothing strength calculated in the smoothing strength calculating unit.

BRIEF DESCRIPTION OF DRAWINGS

FIG. 3 is a flowchart of the operation of the microscope system of the embodiment of the present invention when the system constructs a 3D image using the DFF method.

DESCRIPTION OF EMBODIMENTS

A microscope system according to one embodiment of the present invention is described below with reference to the accompanying drawings.

Figure 1:
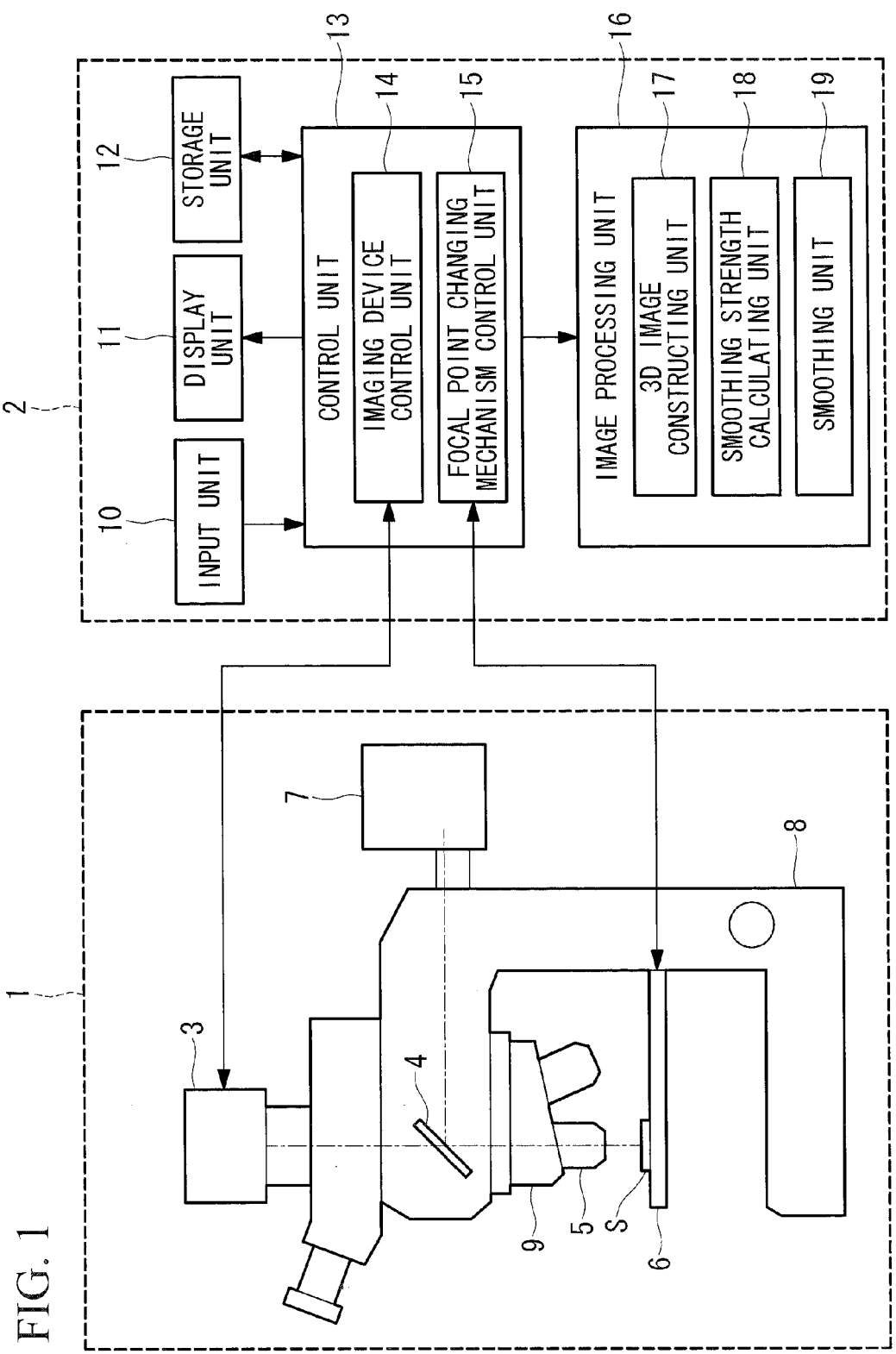
FIG. 1 is a diagrammatic illustration of a general configuration of a microscope system in accordance with one embodiment of the present invention.

As shown in FIG. 1, the microscope system of this embodiment includes a microscope device 1, and a host system 2 that is coupled to and controls the microscope device 1 such that information can be transmitted to each other. The host system 2 performs a predetermined image processing on specimen images captured by the microscope device 1.

The microscope device 1 includes an electrically-driven stage 6 on which a specimen S is placed; a microscope body 8 for supporting the electrically-driven stage 6 and holding an objective lens 5 via a revolver 9; a light source 7, e.g. a halogen or LED light source, for emitting illumination light with a predetermined wavelength to the specimen S; and an imaging device 3 for picking up images of the specimen S. In the following descriptions, the optical axis direction of the objective lens 5 shown in FIG. 1 is defined as the Z direction, and a plane perpendicular to the Z direction is defined as the XY plane.

The electrically-driven stage 6 is equipped with a motor (not shown) for moving a specimen supporting surface, on which the specimen S is placed, in the Z direction, that is, the direction perpendicular to the specimen supporting surface. The motor is driven by a focal point changing mechanism control unit 15 described later to move the specimen supporting surface in the Z direction.

The microscope body 8 includes an illumination optical system for epi-illuminating the specimen S. For example, the illumination optical system is configured to include an optical element such as a half mirror 4 arranged in the light path of illumination light emitted from the light source 7 for reflecting the illumination light.

The revolver 9 is rotatably connected to the microscope body 8 and carries a plurality of objective lenses 5 with different magnifications. The revolver 9 can be rotated to place the selected objective lens 5 above the specimen S and in the light path of observation light. The objective lenses 5 have different optical properties such as magnification and are removably mounted to the revolver 9.

In this embodiment, the revolver 9 carries at least one objective lens 5 for each of the following two types of lenses: lenses with relatively low magnifications such as magnification of 2× or 5× (hereinafter referred to as "low magnification objective lens" as appropriate), and lenses with higher magnifications than those of the low magnification objective lens, such as magnification of 20×, 40× or 50× (hereinafter referred to as "high magnification objective lens" as appropriate). Magnification is changed not only by switching the objective lenses 5. For example, the device can be configured such that magnification is changed by using a zoom optical system or by switching between a zoom optical system and the objective lens.

The imaging device 3 includes an image sensor element such as CCD or CMOS image sensor for picking up images of the specimen. In picking up images of the specimen, the specimen S is illuminated with illumination light which is emitted from the light source 7 and passes through the illumination optical system, and the return light from the specimen S enters the objective lens. The image sensor element picks up an observation image of the specimen S by converting the return light from the specimen S into an electrical signal under the control of an imaging device control unit 14. The imaging device 3 outputs the picked-up observation image as image data to the host system 2 described later.

The host system 2 includes an input unit 10, a display unit 11, a storage unit 12, a control unit 13, and an image processing unit 16.

The input unit 10 is implemented by a keyboard, a mouse, a touch panel, various switches or the like. The input unit 10 generates a control signal based on operator's input and provides the control signal to the control unit 13.

The display unit 11 can be a display device such as a cathode ray tube (CRT), a liquid crystal display (LCD), or an organic electroluminescence (organic EL) display. The display unit 11 receives a display signal from the control unit 13 and displays various images according to the received display signal. When the display unit 11 features a touch panel function, the display unit 11 can also be used as the input unit 10.

The storage unit 12 can be implemented by various IC memories such as ROM or RAM including rewritable flash memory, a hard disk drive incorporated therein or connected to a data communication terminal, an information storage medium such as a CD-ROM and a reading and writing device therefor, and the like. The storage unit 12 stores programs required for the operation of the host system 2 and for the implementation of various functions featured in the host system 2. For example, the storage unit may store an image processing program for the image processing of this embodiment, and data used during execution of the program.

The control unit 13 generates instructions on the operational timings of the input unit 10, the display unit 11, the storage unit 12, and the image processing unit 16 of the host system 2, and transfers data to those units, thereby controlling the overall operation of the respective units of the host system in an integrated manner. Moreover, the control unit 13 includes the imaging device control unit 14 for controlling the imaging device 3, and the focal point changing mechanism control unit 15 for controlling and driving the electrically-driven stage 6.

The imaging device control unit 14 drives and controls the imaging device 3 of the microscope device 1 by setting the gain, on/off-switching of its automatic exposure control function, setting the exposure time, and the like.

The focal point changing mechanism control unit 15 detects a predetermined origin position in the Z direction of the electrically-driven stage 6 with an origin position sensor (not shown), and controls the driving amount of the motor from the origin position. This allows the specimen S to be moved to a Z position within a predetermined height range so as to adjust the focus of the specimen S. Moreover, the focal point changing mechanism control unit 15 receives Z position information of the electrically-driven stage 6 as appropriate.

The image processing unit 16 functions as an image processing device. That is, it acquires a specimen image picked up in the microscope device 1 via the control unit 13, along with its associated information such as the Z position, the imaging settings, and the type of objective lens, and then it processes the acquired specimen image based on the associated observation information. More specifically, the image processing unit performs an image processing for the acquired specimen image based on the observation information associated with the image, and then provides the processed specimen image through the control unit 13 to the storage unit 12 for storing the processed image, or to the display unit 11 for displaying the processed image.

Moreover, the image processing unit 16 includes a 3D image constructing unit 17 for constructing 3D image data based on a plurality of observation images acquired by the imaging device 3; a smoothing strength calculating unit 18 for calculating smoothing strength $\alpha$ for smoothing the constructed 3D image data, based on the optical information of the microscope device 1; and a smoothing unit 19 for smoothing the 3D image data with the calculated smoothing strength $\alpha$.

The host system 2 can be implemented by an existing hardware configuration which includes a CPU, a video board, a main storage device such as a main memory, an external storage device such as a hard disk and various storage media or the like, a communication device, an output device such as a display device or a printing device, an input device, and an interface device that connects respective units or connects an external input. For example, a general-purpose computer such as a workstation or a personal computer can be used for implementing the host system.

Figure 2:
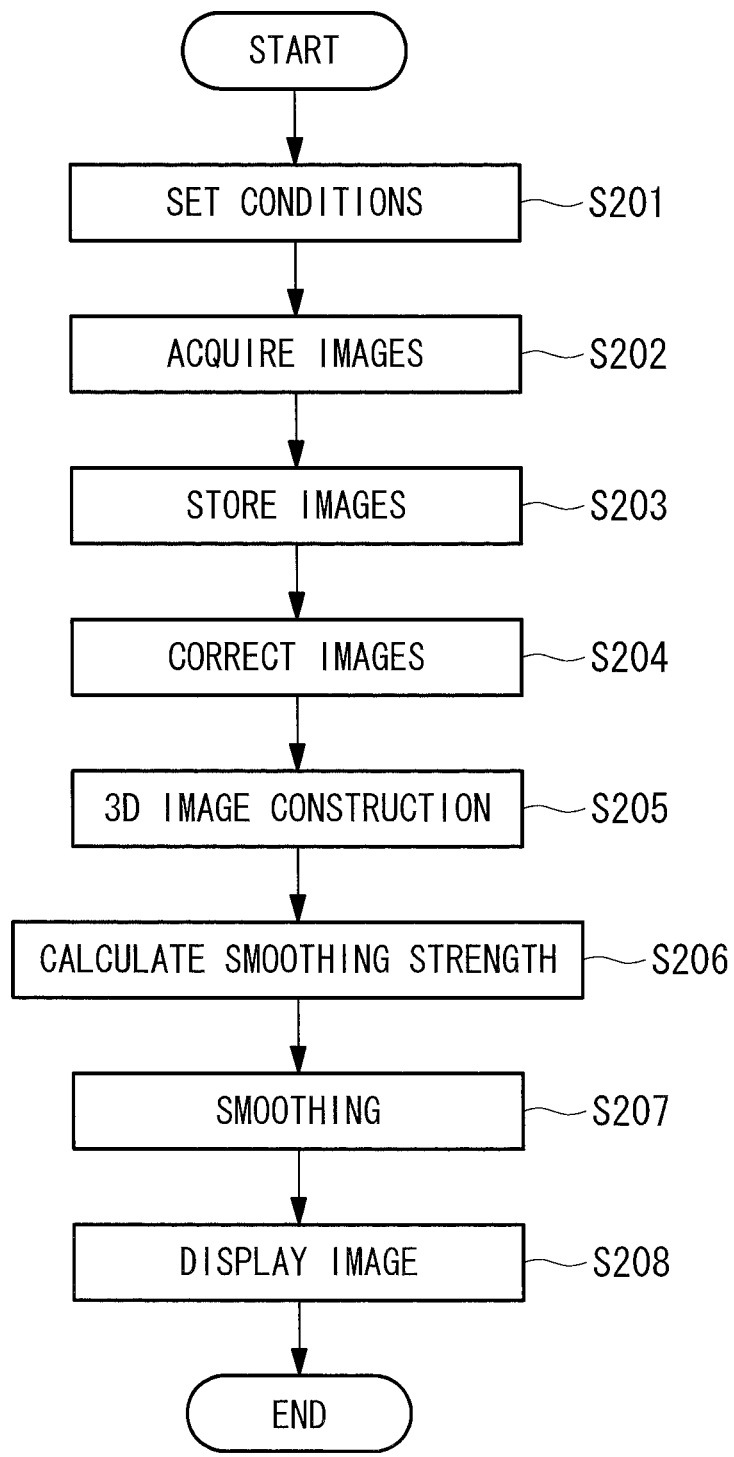
FIG. 2 is a flowchart of the operation of the microscope system of the embodiment of the present invention when the system constructs a 3D image.

Next, the operation of the microscope system of this embodiment in constructing a 3D image will be described below with reference to the flowchart shown in FIG. 2.

First, according to image processing conditions received from the input unit 10, the control unit 13 sets conditions for acquiring observation images from the microscope device 1 (Step S201). The conditions to be set in this step include the depth-of-field, the size of field-of-view, the Z direction range covering a specimen S, and the image recording pitch (imaging position interval) in the Z direction as the optical information.

In subsequent Step S202, the control unit 13 provides the focal point changing mechanism control unit 15 and the imaging device control unit 14 with a signal of instructions to pick up images of the specimen S. According to the signal of instructions, the focal point changing mechanism control unit 15 drives the electrically-driven stage 6, and the imaging device control unit 14 picks up observation images at different Z positions according to the image recording pitch set in Step S201 within the predetermined imaging range to obtain data of images picked up in different XY planes (hereinafter referred to as "slice images" as appropriate).

More specifically, the focal point changing mechanism control unit 15 moves the electrically-driven stage 6 until the focal point is at one end of the specimen S in the Z direction, followed by moving the electrically-driven stage 6 within the Z direction range set in Step S201. The focal point changing mechanism control unit 15 may move the electrically-driven stage 6 in such a manner that the stage repeatedly moves and stops in the pitch set in Step S201, or the stage continuously moves at a constant speed. The Z direction range within which the electrically-driven stage 6 is moved is preferably less than the depth of focus of the magnifier optical system including the objective lens 5.

The imaging device 3 stores slice images of the specimen S in the storage unit 12 when the electrically-driven stage 6 stops, or at predetermined time intervals (Step S203). Each slice image is stored in association with at least a Z position at which the image is picked up.

The image processing unit 16 performs predetermined corrections on each slice image stored in the storage unit 12 (Step S204). Examples of the corrections include corrections to relative shift and/or rotation in the XY plane between slice images caused due to the vibration or lower straightness of the microscope, and corrections to magnification differentials between slice images in the case of a non-telecentric optical system. The correction techniques to be used include template matching, matching methods utilizing a feature point such as corner detection, and methods utilizing a calibration value such as magnification variation information of the microscope device 1.

In subsequent Step S205, the 3D image constructing unit 17 constructs a 3D image by using the so-called DFF method.

The construction of a 3D image by the DFF method is described with reference to the flowchart shown in FIG. 3. The 3D image constructing unit 17 calculates focusing evaluation values for all the pixels of all the slice images stored in the storage unit 12 to evaluate whether they are in focus or not (Step S301).

The focusing evaluation values can be obtained by using an edge emphasis filter such as a Laplacian filter and a Sobel filter, or by using a spatial frequency analysis utilizing Fourier transformation, wavelet transformation, or the like.

Then, among focusing evaluation values for each set of pixels at the same position in all the different slice images, the maximum focusing evaluation value is determined (Step S302). The maximum value may be determined by fitting focusing evaluation values to a quadratic function or the like. After the determination of the maximum values for the respective sets of pixels at all the positions, Z positions of the respective images containing the pixels with the maximum values are assigned to those pixels (Step S303). This allows a 3D image with all pixels having their Z coordinates to be generated.

In subsequent Step S304, as the 3D image obtained in Step S303 should further include pixels that lack a contrast necessary for detection of their focal points, such pixels are obtained by interpolating the Z positions of their peripheral pixels having contrasts (In Step 304). Whether a pixel lacks a contrast or not can be determined by whether or not the maximum focusing evaluation value is lower than a predetermined threshold value. The interpolation process is performed by linear interpolation or spline interpolation. Moreover, the focused parts in the slice images can be combined to form an all-in-focus image with its all parts are focused.

Thus, the all-in-focus image as well as the 3D image may be constructed in this step.

Upon construction of the 3D image, the smoothing strength calculating unit 18 calculates smoothing strength $\alpha$, which represents the degree of smoothing to which the 3D image is subjected (Step S206). The smoothing strength $\alpha$ is calculated based on depth-of-field information, and specifically expressed by the following equation (4):

$$\alpha = \text{depth-of-field/field-of-view} \quad (4)$$

The field-of-view is a viewing field of a specimen image, and specifically expressed as (a diagonal length of an image sensor element)/(an optical magnification).

The depth-of-field (DOF) is expressed, for example, by the following equation (5):

$$DOF = \frac{\lambda}{2NA^2} \quad (5)$$

where NA is a numerical aperture of the objective lens, and $\lambda$ is a wavelength.

In next Step 207, the smoothing unit 19 smoothes the 3D image based on the calculated smoothing strength $\alpha$. The smoothing unit 19 performs smoothing of the 3D image data by a filtering process with a filtering strength set based on the calculated smoothing strength $\alpha$, or the like.

For example, smoothing process using Gaussian weighting shown in the following equation (6), is performed by setting Gaussian strength $\sigma$ at a value of the smoothing strength $\alpha$ multiplied by a constant k as shown in equation (7), and then applying a convolution operation to the 3D image. In the equation (7), i and j represent X-directional and Y-directional distances, respectively, from the center of the filtering window.

$$h(i, j) = \frac{1}{2\pi\sigma^2} \exp\left(-\frac{i^2 + j^2}{2\sigma^2}\right) \quad (6)$$

$$\sigma = k\alpha \quad (7)$$

where k is a constant.

When a pixel of the 3D image is (x, y) and the Z position of the pixel is z(x, y), a corresponding position in the smoothed 3D image z'(x, y) is calculated by performing a convolution operation between z and h as expressed in the following equation (8).

When a window size w is defined as the maximum distance from the center of the filtering window obtained by the convolution operation, the window size w is set to a value determined based on $\sigma$. For example, the window size w is set to $3\sigma$.

$$z'(x, y) = \sum_{i=-w}^{w} \sum_{j=-w}^{w} z(x - i, y - j) \frac{1}{2\pi\sigma^2} \exp\left(-\frac{i^2 + j^2}{2\sigma^2}\right) \quad (8)$$

Types of filters that can be used for smoothing other than a Gaussian-filter include a bilateral filter, a median filter, and an averaging filter. For these types of filters, the smoothing strength $\alpha$ can be set at a value determined based on the smoothing strength σ in the same manner as the Gaussian-filter, or a value determined based on the filtering window size.

In Step S207, a threshold value for smoothing strength α is set because too great a depth-of-field level can cause too great smoothing strength. For example, in the case of a Gaussian-filter, if the Gaussian strength σ is greater than a predetermined threshold value m, the Gaussian strength is set at a value of m as expressed in the following equation (9).

$$\sigma = k\alpha \quad (9)$$

if σ>m then σ=m.

Upon completion of constructing the 3D image by the image processing unit 16, in Step S208, the control unit 13 stores the constructed 3D image in the storage unit 12, and instructs the display unit 11 to display the 3D image and/or the all-in-focus image. Similarly, when an all-in-focus image is constructed, the control unit 13 stores the image in the storage unit 12 and instructs the display unit 11 to display the image. In response to the instructions from the control unit 13, the display unit 11 displays the 3D image or all-in-focus image that is specified by instructions from the input unit 10.

According to the above-described embodiment of the present invention, in constructing 3D image data based on a plurality of observation images with different focal points acquired by the microscope device, smoothing strength is calculated based on the optical information of the microscope device used to acquire observation images from which the 3D image data are generated, and thus smoothing can be performed on the 3D image data with smoothing strength properly determined depending on depth-of-field. Thus, a 3D image can be constructed with improved display image quality.

which means that since a smoothing process in construction of a 3D image is performed with smoothing strength calculated based on a ratio of the depth-of-field expressed as the amount of abnormal value in the Z direction, to the field-of-view expressed as the size in the XY plane, the 3D image data is properly corrected based on the observed level of an abnormal value in the displayed image so that a 3D image can be constructed with improved display image quality.

Though the smoothing strength α is calculated based on the equation (4) in the above-described embodiment, the smoothing strength can alternatively be calculated by the following equation (10):

$$\alpha = \text{depth-of-field/resolution} \quad (10)$$

The resolution in the equation is a resolution in the X or Y direction and is calculated by the following equation (11):

$$\alpha = 0.61 \frac{\lambda}{NA} \quad (11)$$

where NA is a numerical aperture of the objective lens, and λ is a wavelength.

Since the use of such smoothing strength α allows for smoothing of a 3D image with smoothing strength based on a ratio of the depth-of-field expressed as the resolution in the Z direction to the resolution in the X or Y direction, the discomfort feeling caused due to the difference in resolutions between in the X or Y direction and in the Z direction is reduced so that a 3D image can be constructed with improved display image quality.

REFERENCE SIGNS LIST

1 microscope device
2 host system
3 imaging device
6 electrically-driven stage
13 control unit
14 imaging device control unit
15 focal point changing mechanism control unit
16 image processing unit
17 3D image constructing unit
18 smoothing strength calculating unit
19 smoothing unit

The invention claimed is:

1. A microscope system comprising:
a microscope device comprising an objective lens placed in a light path of observation light and configured to acquire a plurality of observation images with different focal points;
a processor comprising hardware, wherein the processor is configured to:
construct 3D image data based on the observation images,
calculate smoothing strength for smoothing the 3D image data, based on optical information of the microscope device, and
smooth the 3D image data with the calculated smoothing strength,
wherein the smoothing strength is calculated by means of the following equation (1):

$$\alpha = \text{depth-of-field/field-of-view} \quad (1)$$

wherein α is smoothing strength, and
wherein the depth-of-field (DOF) is a value calculated by the following equation (5):

$$DOF = \frac{\lambda}{2NA^2} \quad (5)$$

wherein NA is a numerical aperture of the objective lens and λ is a wavelength of light.

2. The microscope system according to claim 1, wherein the smoothing of the 3D image data with the calculated smoothing strength is a Gaussian-filter defined by means of the following equation (3):

$$h(i, j) = \frac{1}{2\pi\sigma^2} \exp\left(-\frac{i^2 + j^2}{2\sigma^2}\right) \quad (3)$$

where σ is Gaussian strength: σ=kα, where k is a constant.

3. The microscope system according to claim 2, wherein, if the Gaussian strength σ is larger than a predetermined threshold value m, the smoothing of the 3D image data with the calculated smoothing strength is the Gaussian-filter defined by means of the equation (3) with σ=m.

* * * * *